United States Patent [19]

Dinkha et al.

[11] Patent Number: 4,850,278
[45] Date of Patent: Jul. 25, 1989

[54] CERAMIC MUNITIONS PROJECTILE

[75] Inventors: Brian I. Dinkha, Westminister; Paul B. Jasa, Denver; Brian Seegmiller, Arvada; Alden C. Simmons, Boulder, all of Colo.

[73] Assignee: Coors Porcelain Company, Golden, Colo.

[21] Appl. No.: 903,307

[22] Filed: Sep. 3, 1986

[51] Int. Cl.[4] .................. F42B 8/00; F42B 11/00

[52] U.S. Cl. .................. 102/501; 102/444; 102/529; 102/506; 501/95; 501/103; 501/104; 501/128

[58] Field of Search ............ 102/430, 439, 444, 501, 102/529, 502, 498, 491, 506, 517-519; 501/90, 95, 103, 128, 104

[56] References Cited

U.S. PATENT DOCUMENTS

| | | | |
|---|---|---|---|
| 2,315,853 | 4/1943 | Hodgson | 102/529 |
| 2,926,612 | 3/1960 | Alton, III | 102/92.5 |
| 3,123,003 | 3/1964 | Lange, Jr. et al. | 102/529 |
| 3,232,233 | 2/1966 | Singleton | 102/92.5 |
| 3,276,369 | 11/1966 | Bell | 102/24 |
| 3,338,167 | 8/1967 | Jungermann et al. | 102/92.7 |
| 3,375,108 | 3/1968 | Wyman, Sr. et al. | 75/202 |
| 3,463,047 | 8/1969 | Germershausen | 86/23 |
| 3,902,683 | 9/1975 | Bilsbury | 244/3.1 |
| 4,040,359 | 8/1977 | Blajda et al. | 102/93 |
| 4,067,745 | 1/1978 | Garvie et al. | 106/57 |
| 4,107,579 | 8/1978 | Carter | 102/41 |
| 4,108,074 | 8/1978 | Billing, Jr. et al. | 102/92.7 |
| 4,165,692 | 8/1979 | Dufort | 102/529 |
| 4,208,968 | 6/1980 | Hubsch et al. | 102/529 |
| 4,508,036 | 4/1985 | Jensen et al. | 102/44 |
| 4,527,481 | 7/1985 | Evans et al. | 102/204 |
| 4,704,943 | 11/1987 | McDougal | 89/36.02 |

FOREIGN PATENT DOCUMENTS

| | | |
|---|---|---|
| 8300069 | 12/1983 | Australia . |
| 1154793 | 10/1983 | Canada . |
| 538268 | 7/1941 | United Kingdom . |
| 0013599 | 7/1980 | United Kingdom . |

OTHER PUBLICATIONS

Evans, A. G. "Fracture Mechanics Determinations", Fracture Mechanics of Ceramics vol. 1, p. 17 (1974).
Weibull, W. "A Statistical Distribution Function of Wide Applicability" Journal of Applied Mechanics, vol. 18, Sep. 1951, pp. 293-297.
Drennan, J. and Hannink, R. J. H., "Effect of SrO Additions on the Grain-Boundary Microstructure and Mechanical Properties of Magnesia-Partially-Stabilized Zirconia", Journal of the American Ceramics Society, vol. 69, number 7, pp. 541-546.
Hughan, Robert R. and Hannink, Richard H. J., "Precipitation During Controlled Cooling of Magnesia-Partially-Stabilized Zirconia", Journal American Ceramic Society, vol. 69, number 7, pp. 556-563.
Hannink, R. H. J. and Swain, M. V., "Magnesia-Partially-Stabilised Zirconia: The Influence of Heat Treatment on Thermomechanical Properties", Journal of Australian Ceramic Society, vol. 18, number 2, pp. 53-62, 1982.
Swain, M. V., "Elastic Deformation of Mg-PSA and its Significance for Strength-Toughness Relationship of Zirconia Toughened Ceramics", Acta Metall, vol. 33, number 11, pp. 2083-2091.
Coors/Ceramics "TTZ (Transformation Toughened Zirconia)".
Coors/Ceramics "Material for Tough Jobs".
Magnesium Elektron, "Data Sheet 111A".
Nilsen Sintered Products "Partially Stabilized Zirconia".
Toyo Soda Manufacturing Company, Ltd., "TSK Super-Z ($ZrO_2$-$AL_2O_3$ Powder)".
Toyo Soda Manufacturing Company, Ltd. "The World's Strongest".
Magnesium Elektron "Zirconium Oxide Special Ceramic Grades" Data Sheet 307.
Steinbreck, R. W. and Heuer, A. N., "R-Curve Behavior and the Mechanical Properties of Transformation Toughened $ZrO_2$-Containing Ceramics".

Primary Examiner—Harold J. Tudor
Attorney, Agent, or Firm—Sheridan, Ross & McIntosh

[57] ABSTRACT

A ceramic munitions projectile, particularly useful for practice or target munitions is provided. The projectile is preferably made of zirconia which is densified by a pressureless sintering method. The projectile has sufficient toughness to withstand acceleration and torque created during projectile firing and trajectory.

19 Claims, 1 Drawing Sheet

CERAMIC MUNITIONS PROJECTILE

FIELD OF THE INVENTION

The present invention relates to a munitions projectile made of a ceramic material, and particularly relates to a frangible projectile useful in practice or target munitions

BACKGROUND OF THE INVENTION

Firing ranges are typically used by persons practicing munitions firing, including military, law enforcement, sportsmen, and recreational users. When such a firing range has been used heavily or for an extended period, using ordinary metallic bullets or projectiles, the area near the firing range can become dangerous because of the presence of large numbers of expended rounds embedded in the ground in the target area. These expended rounds can create danger by providing a hard surface from which new rounds can ricochet in an unpredictable and dangerous manner. The expended rounds can be removed by, for example, bulldozing although at a large expense, particularly when the practice range is extensive, as in the case of a military aerial practice range.

The danger from ricochets are not limited to ricochets caused by expended rounds. Projectiles such as bullets can ricochet from the ground or from a target even when the firing range is substantially free of expended rounds. For this reason, it is often desirable that practice munitions disintegrate upon striking the ground or upon striking a target.

A further difficulty with extensive use of ordinary metallic projectiles on a firing range occurs when a target is provided for practice purposes. In military or law enforcement practice, the targets often comprise expendable or dummy objects such as vehicles, tanks, buildings, etc. Extensive use of such a target eventually results in destruction of the target, requiring replacement.

Many attempts have been made to provide a projectile which is frangible, i.e. which fractures or disintegrates upon striking a target or the ground or, in some cases, upon exiting the gun muzzle. Attempts at producing a frangible or practice projectile have included projectiles composed of or including compacted metal powder (U.S. Pat. No. 3,463,047, issued Aug. 26, 1969 to Germerschausen; U.S. Pat. No. 3,338,167, issued Aug. 29, 1967 to Karlsruhe; and U.S. Pat. No. 3,123,003, issued Mar. 3, 1964 to De Jarnett, et al.), plastics or plastic composites (U.S. Pat. No. 4,108,074, issued Aug. 22, 1978 to Billing, Jr., et al.; U.S. Pat. No. 3,902,683, issued Sept. 2, 1975 to Bilsbury; U.S. Pat. No. 4,040,359, issued Aug. 9, 1977 to Blajda, et al.), epoxies or resins (U.S. Pat. No. 4,508,036, issued Apr. 2, 1985 to Jensen, et al.), and cement (U.S. Pat. No. 4,109,579, issued Aug. 29, 1978 to Carter). U.S. Pat. No. 2,926,612, issued Mar. 1, 1960 to Olin, discloses an aluminum projectile with an aluminum oxide coating about 10 microns in thickness.

None of these materials have been found satisfactory for economically producing a projectile having he ballistic characteristics necessary for realistic practice. A non-metallic projectile which closely mimics the ballistics of an ordinary metallic projectile possesses a number of characteristics. The nonmetallic projectile must have a total mass and a center of mass similar to the replaced metallic projectile. The surface characteristics of the non-metallic projectile must be similar to that of a metallic projectile so that the aerodynamics of the metallic projectile are mimicked. The non-metallic projectile must be sufficiently strong and tough to withstand thermal stress and mechanical stress such as the acceleration and torque forces created during firing and trajectory. The non-metallic projectile must also have sufficient wear and corrosion resistance that it is not erroded by frictive contact with dust or sand particles, rain drops, and the like and is not ablated or vaporized at the temperatures created by air friction during normal trajectory. A projectile which is eroded, ablated or vaporized will undergo a change in mass, center of mass, and/or surface characteristics and its ballistic characteristics will therefore be altered.

In addition to the dangers caused by ricochets, conventional metallic projectiles present a number of other difficulties, whether the projectiles are to be used for target or practice uses or are to be used as ordinary munitions. Metallic munitions can contribute to environmental contamination or deterioration. Metallic projectiles such as steel, or particularly lead projectiles, can affect the environment by, e.g., leaching into the ground water or by wild life ingestion such as ingestion of shot by waterfowl.

A further problem of metallic projectiles in general is their susceptibility to corrosion. Projectiles are often stored for a substantial period of time and exposed to the ambient atmosphere which can have high levels of humidity and acidic or otherwise corrosive components. Further, munitions are often transported through particularly corrosive environments such as salt spray or fog environments, extremely hot or cold environments, and so forth. Ordinary metallic projectiles may require coating or other steps to minimize corrosion, often with only partial success.

Ceramics are among materials which are known to, in general, have good corrosion resistance. Ceramics have not, however, found use as munitions projectiles because of the difficulty of producing a ceramic which is sufficiently inexpensive that it can be used in place of traditional metallic projectiles and which is able to survive the stresses experienced during storage, transport, and loading as well as during firing and trajectory. During transport, for example, cartridges, shells, and other munitions are often subjected to rough handling of a type which causes many conventional types of ceramics to develop cracks or other flaws. These cracks or flaws may not be visibly detectable but may cause the ceramic to fail during firing or trajectory. A munitions projectile is subjected to a number of environments or phases during its firing and trajectory, each phase having different stress characteristics. Specifically, the projectile stress environment is different for the projectile firing, travel through the barrel, trajectory through the air, and impact phases. The magnitude and type of stress during each phase depends on a number of characteristics including gun characteristics (e.g. caliber, rifling, length of barrel, etc.), type of propellant (e.g. slow burn, fast burn, etc.), projectile shape (e.g. ogive shape, bourrelet shape, driving band shape, etc.), trajectory medium (low altitude versus high altitude atmosphere, water, vacuum), and target (ground, solid target, etc.).

In the firing environment, the projectile initially experiences thermal and mechanical shock loading. Detonation sends a compressive shock wave through the projectile which, when reflected, applies tensile stresses to the projectile. Rotation of the projectile also loads the projectile in tension Thermal stresses due to temperature gradients also load the projectile in tension, shear and compression. When the tensile and compressive stresses exceed the respective strengths of the projectile, cracks develop and/or grow in the projectile. When these cracks propagate to a critical size, the projectile fails. It has been found that one of the most important stress considerations is the tensile stress at muzzle velocity. Muzzle velocity depends on a number of factors including caliber, propellant type, gun type and others. For example, a 28 centimeter (11 inch) shell may have a muzzle velocity of about 3000 feet per second (about 900 meters per second). A 20 millimeter projectile may have a muzzle velocity of about 2700 feet per second (about 800 meters per second). Muzzle velocities of 4000 ft/sec (1200 m/sec) are rarely exceeded, although velocities of up to about 5300 ft/sec (1600 m/sec) can be attained using special projectile configurations such as a small projectile fitted in a larger propelling base. Lower muzzle velocities are often encountered in connection with low caliber guns. Typical shotgun projectiles may, e.g., have a muzzle velocity of about 1200 ft/sec (360 m/sec) or lower. In general, higher muzzle velocities require higher chamber pressure and result in higher projectile stress. As an example of chamber pressure, the projectile from a 50 caliber artillery shell may be propelled with a maximum chamber pressure of 2800 kg/cm$^2$ or more. As an example of magnitude of stress, a 20 millimeter projectile weighing 200 grams which reaches a velocity of 2700 feet per second, 5 milliseconds after detonation, undergoes a tensile stress of approximately 210 Megapascals (MPa). The tensile stress undergone by such a projectile upon striking a solid target can be on the order of 840 MPa or more.

Selection of a material, particularly a ceramic material suitable as a munitions projectile, however, cannot be accomplished merely by consideration of the stresses discussed above. Rather, the selection of a suitable material is complicated by a number of factors.

First, the intended use of the projectile must be considered. For example, different materials would be suitable for a projectile which must disintegrate upon exiting the muzzle as opposed to a projectile suitable for target or practice use which should survive until impact. Moreover, disintegration of ceramic materials under stress is best understood as a probabilistic phenomenon, i.e. for a given ceramic projectile material, designed to withstand a particular stress value, a certain number of projectiles of that material will disintegrate under a lower stress load, while a certain percentage will survive under significantly higher stress loads. When the desired use is, for example, target firing, the projectile material must be of such a nature that the percentage of projectiles which survive firing and trajectory stresses is high enough that there is not an unacceptable level of wasted materials or time yet the ceramic material must not have so great a strength that an unacceptable percentage of projectiles survives target impact. The level of performance which is acceptable depends, of course, on the intended application. In applications where safety of the user can be critical, such as in military or law enforcement applications, a lower failure rate would be considered acceptable as compared to applications such as hunting, sports competition, or other recreational applications. In general, failure rate should not exceed about 100 parts per million. For more critical uses such as military uses, failure rate should be less than about 50 parts per million, preferably less than about 10 parts per million and most preferably less than 5 parts per million. By failure of the projectile is meant that the projectile disintegrates prematurely, for example, upon firing or travel through a barrel or during trajectory, before striking a target.

In evaluating failure rates, consideration should be given not only to stresses created during firing, trajectory and impact, but also deterioration of projectiles which might occur previous to firing and thus have an impact on firing and post-firing failure. Specifically, projectiles can be subjected to deterioration during storage and transport, and particularly the jarring and shocks associated with handling the projectiles, corrosion and other deterioration which accompanies exposure to humidity, corrosive environments, heat and cold, and stresses which might occur during loading of the projectile into the gun. Although the pre-firing stresses may not produce visible or detectable changes in the projectile, they may result in unobserved microscopic flaws which contribute to projectile structural failure upon or after firing. Failure rate is most realistically evaluated by considering the effect of such pre-firing stresses.

Second, traditional or conventional ceramic materials are very often characterized by an inverse relationship between susceptibility to thermal stress and susceptibility to mechanical stress. Moreover, conventional ceramics such as alumina, mullite, cordierite, porcelain, and so forth normally have insufficient strength and toughness to survive firing and flight environments particularly in relation to high velocity guns.

Third, in order to provide a projectile which mimics the aerodynamic and trajectory characteristics of the corresponding metallic projectile, as well as mimicking the handling, feeding, and loading characteristics of the corresponding metallic projectile, it is desired to use a material which has a density similar to the density of metallic projectiles preferably on the order of about 5 grams/cc or more.

Fourth, because the response of a material to stress, abrasion and the like can be characterized by a large number of properties or measurements, including properties such as hardness, flexural strength at a variety of temperatures, coefficients of thermal expansion and conductivity, shear, bulk, and Young's moduli, Poisson's ratio, stress intensity factor, tensile strength, compressive strength, Weibull modulus, and so forth, it is no straightforward matter to select a material which will provide the characteristics desired for a projectile considering the above three factors. This is particularly true since many of the values for physical parameters are not known or readily available for the conditions to which a bullet will be subjected, such as high loading rates and accelerations, high temperatures and high pressures.

Fifth, because a bullet and a cartridge containing a bullet are subjected to a large range of temperatures, the ceramic should not have thermal expansion characteristics which are so different from those of the material from which the cartridge or other components, e.g. a driving band, are made (typically metals) that the fit between the ceramic and other components becomes either too tight or too loose in response to changes in temperature.

SUMMARY OF THE INVENTION

According the present invention, a projectile is provided which is made of a densified, strong, tough ceramic material having a size and shape wherein it can be fired from a gun capable of firing a metallic projectile. According to one embodiment, the ceramic comprises zirconia. According to another embodiment, the ceramic material has a tensile strength greater than about 250 MPa, a stress intensity factor greater than about 6 MNm$^{\frac{1}{2}}$, a Weibull modulus greater than about 10, a modulus of elasticity less than about 400 GPa, and a thermal expansion coefficient more than about $7.5 \times 10^{-6}/°C$. The present invention also includes a cartridge comprising a ceramic projectile and a method of making a cartridge. Particularly preferred is a frangible ceramic projectile for use in practice or target munitions. According to the present invention, it has been found that a strong, tough, densified ceramic projectile can be provided which will accomplish the objects of the invention, namely producing a munitions projectile, particularly a frangible target or practice projectile which has (1) an acceptable probability of surviving firing and trajectory and an acceptable probability of disintegration upon impact, (2) little or no adverse environmental effect, (3) high resistance to corrosion such as during storage or transport, (4) non-susceptibility to ablation or erosion, (5) surface characteristics which permit the projectile to mimic aerodynamics of metallic projectiles, (6) a thermal expansion coefficient similar to that of metals, and/or (7) a density similar to metallic densities. It has been found that a ceramic material will accomplish the objects of this invention when the material is within a desired range of tensile strength, Young's modulus, stress intensity factor, thermal expansion coefficient, and Weibull modulus. Zirconia ceramics, especially partially stabilized zirconia ceramics, have been found to be suitable. By "densified" is meant that the ceramic material has a density approaching theoretical, preferably greater than about 90 percent of theoretical density, such as that typically accomplished by sintering, hot-pressing, hot isostatic pressing, reaction sintering, or solidification from a melt. By "strong and tough" is meant that the projectile does not significantly disintegrate, ablate or vaporize prior to leaving the gun muzzle or striking a target or the ground. By "gun" is meant any apparatus for firing a projectile including hand guns, rifles, rifled or unrifled launchers, cannon, machine guns, and the like. The present invention is particularly useful for high velocity guns such as 20 mm aircraft machine guns or other larger or smaller caliber high velocity guns. By "frangible" is meant that the projectile disintegrates upon exiting the muzzle or striking a solid target or the ground. To ensure an acceptable probability of disintegration, the tensile strength of a frangible projectile should be less than about 840 MPa. In the preferred embodiment, the frangible projectile does not disintegrate until striking the ground or a target, although a ceramic projectile can be constructed so as to disintegrate upon leaving the gun muzzle, if so desired. By "ceramic" is meant any inorganic, nonmetallic material capable of being densified, e.g. zirconia, especially toughened or partially stabilized zirconia, zirconia-alumina composites, and whisker-reinforced ceramics. Although the projectile comprises a ceramic, the ceramic part may be provided in conjunction with another material such as a metallic or plastic driving band. Such a driving band represents a small proportion of the projectile and does not create a significant ricochet problem or significantly interfere with frangibility.

DETAILED DESCRIPTION OF THE PREFERRED EMBODIMENT

Figure 1:
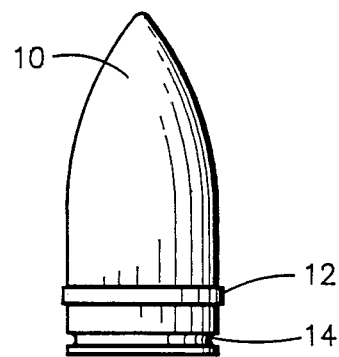
FIG. 1 is a side view of a ceramic projectile.

The present invention relates to a ceramic projectile which survives firing and trajectory stresses, has little adverse environmental impact, is resistant to ablation and erosion, is resistant to corrosion and has surface characteristics and density similar to metallic projectiles. The projectile is formed of a ceramic material which can be incorporated into a cartridge for firing from a gun which is capable of firing a metallic projectile.

The ceramic material must have a sufficiently high strength, fracture toughness, Weibull modulus and thermal expansion coefficient, and a sufficiently low Young's modulus that, for the stress environments for which it is designed, there is a high probability of surviving firing. When it is desired that the projectile disintegrate upon impact, the ceramic material must also be such that the projectile has a low probability of surviving impact. It has been found that an acceptable ceramic material should possess a tensile strength, according to, e.g. ACMA Test No. 4, of more than about 250 MPa, preferably more than about 300 MPa, and most preferably more than about 350 MPa; a critical stress intensity factor, measured, e.g. according to the single-edge notched beam (SENB) Test (as described in Evans, A. G., "Fracture Mechanics Determinations" in *Fracture Mechanics of Ceramics*, Vol. 1, Ed. By R. C. Bradt, D.P. H. Hasselman and F. F. Lange, Plenum Press, N.Y., p. 17 (1974), incorporated herein by reference), of more than about 6 MNm$^{\frac{1}{2}}$, preferably more than about 8 MNm$^{\frac{1}{2}}$, most preferably more than about 12 MNm$^{\frac{1}{2}}$; a Weibull modulus measured, e.g. as described in Weibull, W. "A Statistical Distribution Function of Wide Applicability", *J. Of Applied Mechanics*, Vol. 18, pp. 293–297, September 1951, incorporated herein by reference, of more than about 10, preferably more than about 14, and most preferably more than about 18; a coefficient of thermal expansion measured, e.g. according to ASTM C372-56 of more than about $7.5 \times 10^{-6}/°C.$, preferably more than about $9 \times 10^{-6}/°C.$, and most preferably more than about $10 \times 10^{-6}/°C.$; and a Young's modulus (modulus of elasticity), measured by, e.g. ASTM C623-71, less than about 400 GPa, preferably less than about 300 GPa, and most preferably less than about 200 GPa.

A projectile with these characteristics will be operable for, e.g. the 20 millimeter projectile described above. Special applications, e.g. particularly low velocity guns, or extremely high velocity guns, can be used with ceramics having values for the above four parameters within a range adjusted mutatis mutandis, giving consideration to the above-described factors.

Examples of ceramic materials which can be used in producing the fragible projectile according to this invention include:

zirconias, particularly partially stabilized zirconias, such as magnesia-, calcia-, yttria-, or ceria-partiallystabilized zirconias, including those materials described in European Patent Application No. 80300025.6, Publication No. 0 013 599, filed Mar. 1, 1980 by Commonwealth Scientific and Industrial Research Organization; U.S. Pat. No. 4,067,745 issued Jan. 10, 1978 to Garvie, et al., entitled "Ceramic Materials"; PCT Application No. PCT/AU83/00069, International Publication No. WO 83/04247, filed May 27, 1983 by Commonwealth Scientific and Industrial Research Organization, entitled "Zirconia Ceramic Materials and Method of Making Same"; Canadian Patent No. 1,154,793 issued Nov.4, 1983 to Otagiri, et al., entitled "Zirconia Ceramics and Method of Producing the Same"; all incorporated herein by reference; zirconiatoughened alumina (alumina/zirconia composites) such as 95 weight percent $Al_2O_3$ - 5 weight percent $ZrO_2$ to 10 weight percent $Al_2O_3$ - 90 weight percent $ZrO_2$, the $ZrO_2$ fraction containing 0 to 6 weight percent $Y_2O_3$; and SiC whisker-reinforced ceramics (e.g. alumina or mullite).

It has been found that magnesia-partially-stabilized zirconia is less susceptible to flawing from stresses typically incurred during shipping and handling than, e.g., yttria-partially-stabilized zirconia. Magnesia-partially-stabilized zirconia has increased critical stress intensity values ($K_{Ic}$) for millimeter-scale flaw sizes, compared with yttria-partially-stabilized zirconia, even though yttria-partially-stabilized zirconia is often superior for smaller flaw sizes. Thus, magnesia-partially-stabilized zirconia is preferred such as tranformation toughened zirconia (TTZ) produced by Coors Ceramics, having a tensile strength at 25° C. (ALMA Test #4) of about 352 MPa, a Young's modulus (ASTM C623-71) of about 200 GPa, a thermal expansion coefficient between 25 and 1000° C. (ASTM C372-56) of about $10.1 \times 10^{-6}$/°C., a stress intensity factor (single edged notched beam) of about 8-12 $MNm^{\frac{1}{2}}$ and a Weibull modulus (4 point bend) of about 0.

Partially-stabilized zirconias are particularly useful when very low structural failure rates for the projectiles are required, such as on the order of less than a few parts per million. It has been found that the preferred zirconia materials may have a lower average strength than less preferred materials when analyzed at a high (e.g. 50 percent) failure rate level, but that these same preferred materials will out-perform (i.e. will provide a better average strength) the non-preferred materials when analyzed at a lower level of failure rate, such as 5 to 100 parts per million or less.

Operable methods of manufacture of the ceramic are described in the above-cited patents although other processing methods may also be operable and may be preferred when special characteristics are desired or in order to achieve economy of manufacture.

Among the materials and methods which are operable for purposes of the present invention, the materials and methods which are preferred, of course, depend upon the intended application and factors such as material availability and cost of manufacture. When it is desired to maximize tensile strength, stress intensity factor, and Weibull modulus, and to minimize Young's modulus for a frangible ceramic projectile the material described in European Patent No. 0 013 599 is preferred. When manufacture cost is a larger consideration, a powder containing a somewhat higher degree of impurities such as silica, alumina or other impurities can be used, although in significant concentrations these impurities can cause undesired loss of properties. When a higher impurity powder is used, it is often necessary to make adjustments in processing, such as addition of materials as described, e.g., in J. Drennan, "Effect of SrO Additions on the Grain-Boundary Microstructure and Mechanical Properties of Magnesia-Partially-Stabilized Zirconia", J. Am. Ceram. Soc. 69, 541–546 (1986), incorporated herein by reference. A preferred procedure involves cooling the sintered body at a rate of more than about 350° C. per hour, to as much as 500° C. per hour, as described in Robert R. Hughan, "Precipitation During Controlled Cooling of Magnesia-Partially-Stabilized Zirconia", J. Am Ceram. Soc. 69, 556–563 (1986), incorporated herein by reference, at least down to about 1000° C. A number of post-sintering treatment regimes have been described in the above-cited references including isothermal holds at various temperatures during cooling, postcooling annealing or "aging", such as described by Hannick, et al., "Magnesia-Partially-Stabilized Zirconia: The Influence of Heat Treatment on Thermal Mechanical Properties", Australian Ceramic Society, Vol. 18, No. 2, pp. 53–62, 1982, incorporated herein by reference. It is preferred, for economic reasons and to provide acceptable material qualities, to avoid post-cooling annealing or aging steps, provided the desired mechanical properties are obtained using the particular starting materials. It is unknown, at this time, if there is any relation between the starting materials and the effect of annealing or aging steps.

Figure 2:
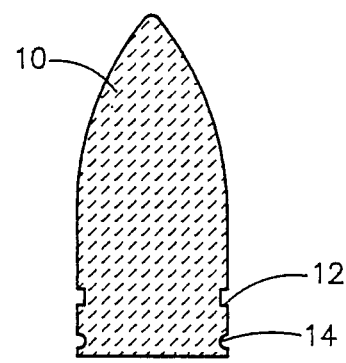
FIG. 2 is a cross-sectional side view of the projectile of FIG. 1.
Figure 3:
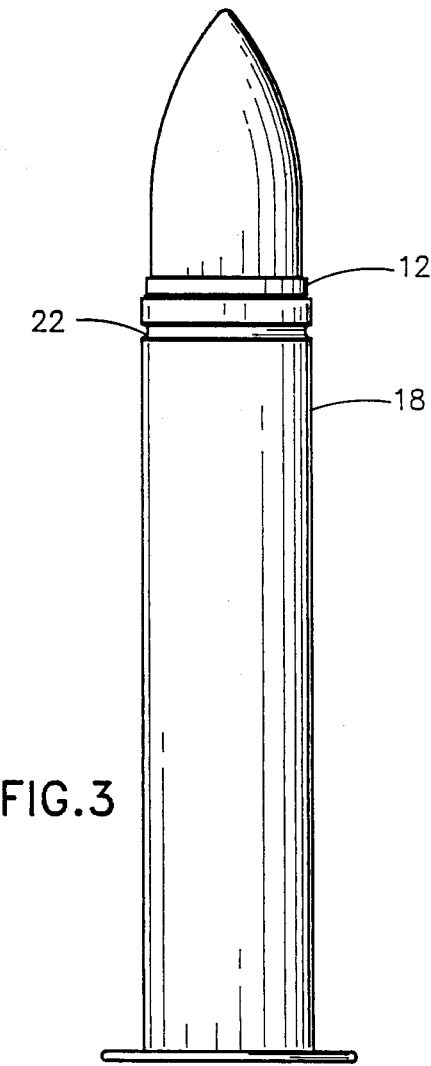
FIG. 3 is a side view of a cartridge containing a ceramic projectile.
Figure 4:
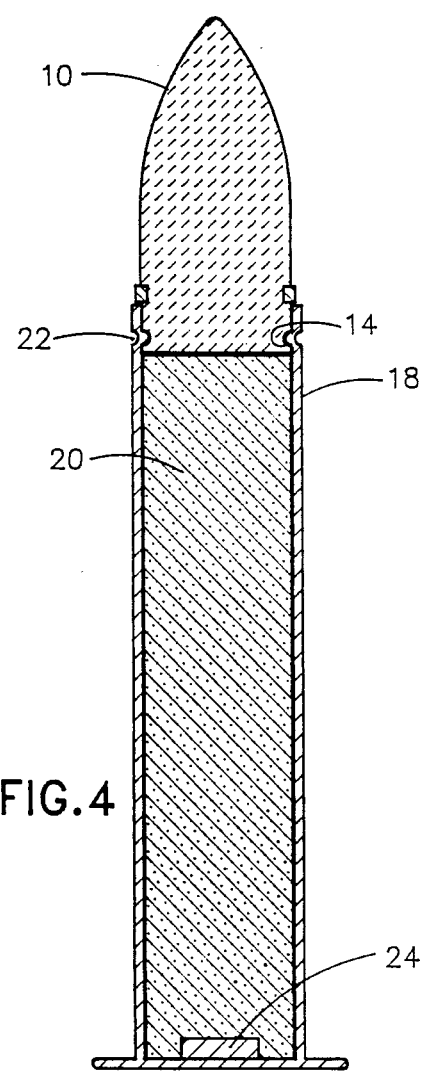
FIG. 4 is a cross-sectional side view of the cartridge of FIG. 3.

Referring now to the drawings, FIGS. 1 and 2 depict a densified ceramic projectile 10 which is used to form a cartridge or shell in the same manner that the replaced metallic projectile would be used. Since the leading edge or surface of the projectile is formed of ceramic and will be exposed to frictive contact with the air or other medium during trajectory, the ceramic projectile is treated, such as by machining, to produce a surface sufficiently smooth that the projectile aerodynamics will mimic the aerodynamics of the replaced metallic projectile. Typically, a means such as indentation 16 is provided forallowing attachment of a driving band 12, shown in FIGS. 1 and 3, for engaging the rifling of the gun barrel. As shown in FIGS. 3 and 4, the sintered ceramic projectile is attached normally by crimping 22, for example, into indentation 14, to the opened end of a casing 18, containing an explosive propellant 20 and a primer 24. The completed cartridge or shell can then be loaded into a gun adapted for use with the particular type of cartridge or shell and can be fired to propel the projectile from the gun.

As will be known to those skilled in the art, a number of modifications or variations on the preferred embodiment described above can be made. The ceramic projectiles can be formed of a number of ceramics. For example, the projectile can be made of a ceramic material which is sufficiently strong and tough that it is not frangible, i.e. such that it does not disintegrate before or upon striking a target. In this regard, ceramic projectiles are not necessarily restricted to practice or target use, but can be used for the ordinary purpose of munitions projectiles. Although it is expected that metallic projectiles would be preferred for economic reasons, ceramics may provide other benefits in special applications, such as propelling projectiles at a velocity high enough to cause ablation or vaporization of ordinary metals, e.g. with a rail gun. Alternatively, the ceramic can be such that the projectile retains its integrity while traveling through the gun barrel or launcher, but disintegrates upon exiting the muzzle. Ceramic projectiles can be used in connection with a variety of guns including handguns, shotguns, rifles, mortar, cannon, tanks, machine guns, rail guns, and launched or missile projectiles. The ceramic projectiles can have incorporated therein various strengthening or toughening materials such as fibers or whiskers. The ceramic can be formed by hot-pressing, hot isostatic pressing, reaction sintering, solidification from a melt, such as single crystal solidification, or other methods known in the ceramic art. The precise ceramic materials will, of course, depend upon the intended application. In this regard, tougher, more strengthened materials are useful for high velocity guns while ceramic materials having a lower degree of strength and toughness can be used in lower velocity guns. The projectile can be provided with a location device or material such as a tracer or an impact-activated pyrotechnic or smoke generator.

Although the preferred embodiment has been described by way of illustration and example, as known to those skilled in the art, a number of variations and modifications of the invention can be practiced within the scope of the present invention as limited only by the appended claims.

What is claimed is:

1. A munitions projectile comprising:
a strong, tough, densified ceramic having a size and shape such that it can be fired from a gun, said ceramic comprising material selected from the group consisting of zirconia, zirconia-toughened alumina and SiC whisker-reinforced alumina.

2. The projectile of claim 1 wherein said projectile is frangible.

3. The projectile of claim 1 wherein said ceramic comprises partially stabilized zirconia.

4. The projectile of claim 1 wherein said zirconia comprises magnesia-partially-stabilized zirconia.

5. The projectile of Claim 1 having a density of at least about 5.5 g/cc.

6. The projectile of claim 1 wherein a leading surface is ceramic.

7. The projectile of claim 1 having a tensile strength greater than about 250 MPa.

8. The projectile of claim 2 having a tensile strength less than about 840 MPa.

9. The projectile of claim 1 having a critical stress intensity factor greater than about 6 $NMm^{\frac{1}{2}}$.

10. The projectile of claim 1 having a coefficient of thermal expansion greater than about $7.5 \times 10^{-6}/°C$.

11. The projectile of claim 1 having a Weibull modulus greater than about 10.

12. The projectile of claim 1 having a modulus of elasticity less than about 400 GPa.

13. A tough, densified munitions projectile comprising a ceramic having a tensile strength greater than about 250 MPa, a stress intensity factor greater than about 6 $MNm^{\frac{1}{2}}$, a Weibull modulus greater than about 10, a coefficient of thermal expansion greater than about $7.5 \times 10^{-6}/°C$., and a modulus of elasticity less than about 400 GPa.

14. The projectile of claim 13 wherein said ceramic comprises material selected from the group consisting of zirconia, zirconia-toughened alumina, and SiC whisker-reinforced alumina.

15. The projectile of claim 13 wherein said projectile is frangible.

16. The projectile of claim 15 wherein said ceramic has a tensile strength less than about 840 MPa.

17. The projectile of claim 13 wherein said ceramic comprises partially-stabilized zirconia.

18. The projectile of claim 13 having a density of at least 5.5 g/cc.

19. A frangible, tough, densified ceramic munitions projectile comprising partially stabilized zirconia having a tensile strength greater than about 350 MPa, a stress intensity factor greater than about 12 $MNm^{\frac{1}{2}}$, a Weibull modulus greater than about 18, a coefficient of thermal expansion greater than about $10 \times 10^{-6}/°C$., and a modulus of Elasticity less than about 200 GPa.

* * * * *

UNITED STATES PATENT AND TRADEMARK OFFICE
CERTIFICATE OF CORRECTION

PATENT NO. : 4,850,278
DATED : July 25, 1989
INVENTOR(S) : Dinkha et al.

It is certified that error appears in the above—identified patent and that said Letters Patent is hereby corrected as shown below:

Column 1, line 61, delete "he" and substitute therefor --the--.

Column 5, line 7, delete "MNm$^{\frac{1}{2}}$" and substitute therefor --MPam$^{\frac{1}{2}}$--.

Column 6, line 41, delete "MNm$^{\frac{1}{2}}$" and substitute therefor --MPam$^{\frac{1}{2}}$--.

Column 6, line 42, in both instances, delete "MNm$^{\frac{1}{2}}$" and substitute therefor --MPam$^{\frac{1}{2}}$--.

Column 7, line 14, delete "zirconiatoughened" and substitute therefor --zirconia-toughened--.

Column 7, line 18, delete "Y2O3" and substitute therefor --Y$_2$O$_3$--.

Column 7, line 36, delete "MNm$^{\frac{1}{2}}$" and substitute therefor --MPam$^{\frac{1}{2}}$--.

Column 7, line 37, delete "0" and substitute therefor --20--.

UNITED STATES PATENT AND TRADEMARK OFFICE
CERTIFICATE OF CORRECTION

PATENT NO. : 4,850,278
DATED : July 25, 1989
INVENTOR(S) : Dinkha et al.

It is certified that error appears in the above—identified patent and that said Letters Patent is hereby corrected as shown below:

Column 10, line 8, delete "$NMm^{\frac{1}{2}}$" and substitute therefor --$MPam^{\frac{1}{2}}$--.

Column 10, line 18, delete "$MNm^{\frac{1}{2}}$" and substitute therefor --$MPam^{\frac{1}{2}}$--.

Column 10, line 37, delete "$MNm^{\frac{1}{2}}$" and substitute therefor --$MPam^{\frac{1}{2}}$--.

Signed and Sealed this

Seventh Day of May, 1991

Attest:

HARRY F. MANBECK, JR.

Attesting Officer

Commissioner of Patents and Trademarks